United States Patent
Sato

(10) Patent No.: US 10,628,096 B2
(45) Date of Patent: Apr. 21, 2020

(54) DEVICE DATA MANAGEMENT SYSTEM FOR MANAGING DEVICE DATA USABLE AS SETTING VALUES

(71) Applicant: CANON KABUSHIKI KAISHA, Tokyo (JP)

(72) Inventor: Junji Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/254,061

(22) Filed: Jan. 22, 2019

(65) Prior Publication Data

US 2019/0227760 A1    Jul. 25, 2019

(30) Foreign Application Priority Data

Jan. 25, 2018 (JP) .................................. 2018-010492

(51) Int. Cl.
| | | |
|---|---|---|
| *G06F 3/12* | (2006.01) | |
| *G06F 21/44* | (2013.01) | |
| *G06F 21/60* | (2013.01) | |
| *H04N 1/00* | (2006.01) | |
| *H04L 29/08* | (2006.01) | |

(52) U.S. Cl.
CPC ............ *G06F 3/1238* (2013.01); *G06F 3/123* (2013.01); *G06F 3/1204* (2013.01); *G06F 3/1222* (2013.01); *G06F 3/1231* (2013.01); *G06F 3/1254* (2013.01); *G06F 3/1288* (2013.01); *G06F 21/44* (2013.01); *G06F 21/608* (2013.01); *H04N 1/0035* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 9,038,052 B2* | 5/2015 | Ishimoto | G06F 8/65 717/169 |
| 9,230,078 B2* | 1/2016 | Hirata | G06F 21/608 |
| 9,584,688 B2* | 2/2017 | Mori | G06F 3/1239 |
| 9,621,623 B2* | 4/2017 | Ohashi | H04L 67/02 |
| 9,696,948 B2* | 7/2017 | Hadano | G06F 3/123 |
| 9,813,574 B2* | 11/2017 | Maki | H04N 1/00854 |
| 2010/0250787 A1* | 9/2010 | Miyata | G06F 3/1203 710/9 |
| 2012/0016938 A1* | 1/2012 | Gallant | H04L 12/14 709/204 |
| 2017/0013110 A1* | 1/2017 | Sato | H04M 1/72533 |

FOREIGN PATENT DOCUMENTS

JP         2017-76857 A    4/2017

* cited by examiner

*Primary Examiner* — Dung D Tran
(74) *Attorney, Agent, or Firm* — Canon U.S.A., Inc., IP Division

(57) ABSTRACT

A system and method for managing device data is provided. When device data managed by a device data management system is applied to a device, an authentication method other than user authentication is sometimes employed because importance is attached to work efficiency. If, however, the device data is easily identified, a third person unrelated to setting work for the device may easily change the device data. To prevent such occurrence, the device data is associated with temporary particular information, and the setting work for the device is performed based on the particular information.

10 Claims, 21 Drawing Sheets

FIG.5

| SETTING DATA ID | ORGANIZATION ID | SETTING DATA NAME | SETTING VALUE FILE | ADDRESS BOOK | TARGET DEVICE |
|---|---|---|---|---|---|
| 3152486128 | 0001 | BUSINESS MEETING WITH COMPANY A (HEAD OFFICE) | S001 | HEAD OFFICE OF COMPANY A.csv | ABC11111 |
| 18004573593 | 0001 | BUSINESS MEETING WITH COMPANY A (BRANCH OFFICE) | S001 | BRANCH OFFICE OF COMPANY A.csv | ABC11112 |
| 5807515798 | 0002 | BUSINESS MEETING WITH COMPANY B | S003 | | |

FIG.6

| PROCESSING NO. | PROCESS | CONTENT TYPE | CONTENT ID |
|---|---|---|---|
| 001 | Download Settings File | Settings | S001 |
| 002 | Update Settings | Settings | S001 |
| 003 | Reboot | — | — |
| 004 | Download Address Book | Address Book | HEAD OFFICE OF COMPANY A.csv |
| 005 | Import Address Book | Address Book | HEAD OFFICE OF COMPANY A.csv |
| ... | ... | ... | ... |

FIG.7A

LOGIN

ORGANIZATION ID: 0001

USER NAME: User01

PASSWORD: ●●●●●●●

LOGIN  CANCEL

FIG.7B

SETTING DATA LIST                USER01 (ORGANIZATION ID: 0001)

CREATE NEW DATA   DELETE

| SETTING DATA NAME | SETTING DATA ID | UPDATED BY | OUTSOURCING DESTINATION | |
|---|---|---|---|---|
| ☐ BUSINESS MEETING WITH COMPANY A (HEAD OFFICE) | 3152486128 | User01 | 0002 | EDIT |
| ☐ BUSINESS MEETING WITH COMPANY A (BRANCH OFFICE) | 1800457359 | User02 | | EDIT |

FIG.8A

| EDITING OF SETTING DATA | USER01 (ORGANIZATION ID: 0001) |

SETTING DATA ID: 3152486128

SETTING DATA NAME: BUSINESS MEETING WITH COMPANY A (HEAD OFFICE)

SETTING VALUE FILE: S001  (REFERENCE...) (EDIT...)

ADDRESS BOOK: HEAD OFFICE OF COMPANY A.csv  (REFERENCE...) (EDIT...)

OUTSOURCING DESTINATION: 0002  (SELECT...)

(SAVE) (CANCEL)

FIG.8B

| SELECTION OF OUTSOURCING DESTINATION | USER01 (ORGANIZATION ID: 0001) |

NOT SELECTED
0002
0003

(ADD) (DELETE)

(OK) (CANCEL)

FIG.9

| SETTING DATA ID | OUTSOURCING DESTINATION ORGANIZATION ID | ALIAS | STATUS | EXPIRATION DATE |
|---|---|---|---|---|
| 3152486128 | 0002 | 4848762108 | ENABLED | 2018/2/7 |
| 3152486128 | 0007 | 7130096452 | DISABLED | |
| 1800457359 | 0002 | 5032340966 | DISABLED | |

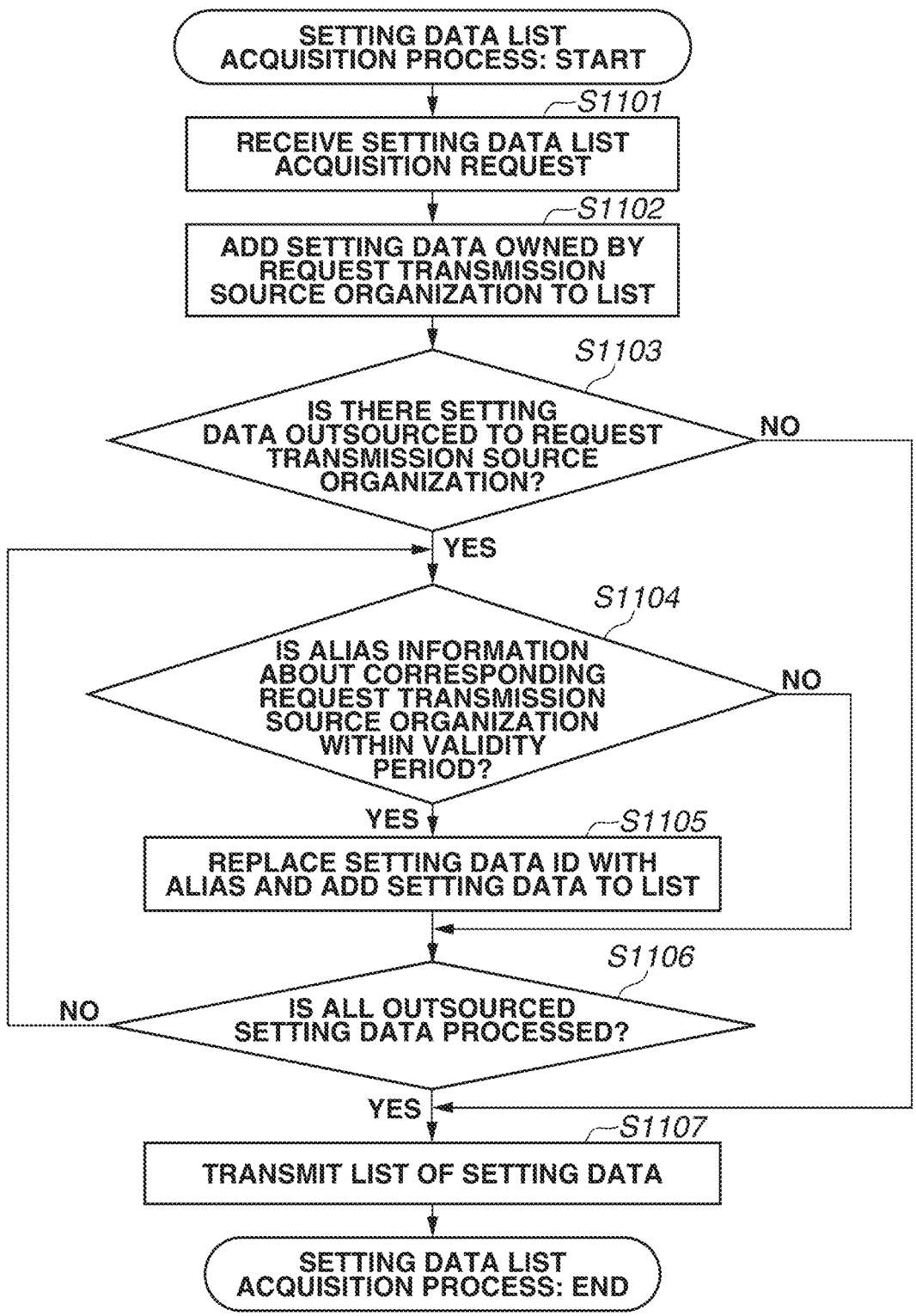

FIG.12A

| SETTING DATA LIST | | | USER02 (ORGANIZATION ID: 0002) | |
|---|---|---|---|---|
| ( CREATE NEW DATA ) ( DELETE ) | | | | |
| SETTING DATA NAME | SETTING DATA ID | UPDATED BY | OUTSOURCING DESTINATION | |
| ☐ BUSINESS MEETING WITH COMPANY B | 5807515798 | User02 | | ( EDIT ) |
| [OUTSOURCED SETTING DATA] | | | | |
| BUSINESS MEETING WITH COMPANY A (HEAD OFFICE) | 4848762108 | User01 | | ( EDIT ) |

FIG.12B

EDITING OF SETTING DATA     USER02 (ORGANIZATION ID: 0002)

SETTING DATA ID: 4848762108

SETTING DATA NAME: [ BUSINESS MEETING WITH COMPANY A (HEAD OFFICE) ]

SETTING VALUE FILE: [ S001 ]  ( REFERENCE... ) ( EDIT... )

ADDRESS BOOK: [ HEAD OFFICE OF COMPANY A.csv ]  ( REFERENCE... ) ( EDIT... )

OUTSOURCING SOURCE: 0001

( SAVE ) ( CANCEL )

FIG.13A

SEARCH FOR SCRIPT

ORGANIZATION ID: 0002

SETTING DATA ID: 4848762108

( SEARCH )  ( CANCEL )

FIG.13B

AUTOMATIC EXECUTION OF SCRIPT

SCRIPT IS FOUND.

ORGANIZATION ID: 0002
 SETTING DATA ID: 4848762108
 SETTING DATA NAME: BUSINESS MEETING WITH
  COMPANY A (HEAD OFFICE)

CONTENTS OF SETTING PROCESSES:
 1. APPLICATION OF FIRMWARE
  FOR SETTING VALUE FILE (S001)
 2. REBOOT
 3. IMPORT OF ADDRESS BOOK
  (HEAD OFFICE OF COMPANY A.csv)
 ...

( EXECUTE )  ( CANCEL )

FIG.15A

```
{
  installationDataList : [
    {
      "metadata": {                                          1501
        "installationDataId": "3152486128",
        "isAlias": false,
        "name": "BUSINESS MEETING WITH COMPANY A (HEAD OFFICE)"
      },
      "installationTarget": {
        "model": "Model-550X",
        "serialNumber": "ABC11111"
      },
      "installationSteps": [
        { "order": 1, "operation": "downloadSettings", "contentType": "Settings", ...},
        { "order": 2, "operation": "updateSettings", "contentType": "Settings", ...},
        ...
      ]
    },
    ...
  ]
}
```

FIG.15B

```
{
  installationDataList: [
    {
      "metadata": {                                          1502
        "installationDataId": "4848762108",
        "isAlias": true,
        "name": "BUSINESS MEETING WITH COMPANY A (HEAD OFFICE)"
      },
      "installationTarget": {
        "model": "Model-550X",
        "serialNumber": "ABC11111"
      },
      "installationSteps" : [
        {"order": 1, "operation": "downloadSettings", "contentType": "Settings", ...},
        {"order": 2, "operation": "updateSettings", "contentType": "Settings", ...},
        ...
      ]
    },
    ...
  ]
}
```

FIG.17

| SETTING DATA ID | OUTSOURCING DESTINATION ORGANIZATION ID | ALIAS | STATUS | EXPIRATION DATE |
|---|---|---|---|---|
| 3152486128 | 0002 | 4848762108 | ENABLED (SETTING PROHIBITED) | 2018/2/7 |
| 3152486128 | 0007 | 7130096452 | DISABLED | |
| 1800457359 | 0002 | 5032340966 | DISABLED | |

FIG.20

| SETTING DATA LIST | | | USER02 (ORGANIZATION ID: 0002) |
|---|---|---|---|

( CREATE NEW DATA )  ( DELETE )

| SETTING DATA NAME | SETTING DATA ID | UPDATED BY | OUTSOURCING DESTINATION | |
|---|---|---|---|---|
| ☐ BUSINESS MEETING WITH COMPANY B | 5807515798 | User02 | | ( EDIT ) |

[OUTSOURCED SETTING DATA]

| BUSINESS MEETING WITH COMPANY A (HEAD OFFICE) | ********* | User01 | | ( EDIT ) |
|---|---|---|---|---|

FIG.21

```
{
  installationDataList: [
    {
      "metadata": {                                    2101
        "installationDataId": "**********",
        "isAlias": true,
        "name": "BUSINESS MEETING WITH COMPANY A (HEAD OFFICE)"
      },
      "installationTarget": {
        "model": "Model-550X",
        "serialNumber": "ABC11111"
      },
      "installationSteps": [
        {"order": 1, "operation": "downloadSettings", "contentType": "Settings", ...},
        {"order": 2, "operation": "updateSettings", "contentType": "Settings", ...},
        ...
      ]
    },
    ...
  ]
}
```

DEVICE DATA MANAGEMENT SYSTEM FOR MANAGING DEVICE DATA USABLE AS SETTING VALUES

BACKGROUND

Field

The present disclosure relates to a device data management system, a control method, and a storage medium for allowing automatic execution for device setting work according to setting data that is used for the device setting work.

Description of the Related Art

When an information processing apparatus (e.g., a digital multifunction peripheral) is installed, appropriate setting work is performed in accordance with the demand by a customer introducing the information processing apparatus. The setting work includes, for example, the update of firmware, the changes in various setting values, and the installation of an application. If, however, there are a large number of work items, it takes time and a man-made mistake is also likely to occur. Further, in a large business, the same setting work is sometimes performed for each of a plurality of information processing apparatuses, which is inefficient. For this reason, there is a device data management system for creating setting data in which the details of setting work is defined in advance, and when the setting work is performed, automatically changing a setting value or installing an application according to the setting data, to improve the efficiency of the setting work. As the main use of the device data management system, a salesperson who meets the customer's demand may create setting data in an office, and a person in charge of setting work may perform the setting work using the setting data in a factory. The publication of Japanese Patent Application Laid-Open No. 2017-76857 discusses such a device data management system.

SUMMARY

According to an aspect of the present disclosure, a device data management system for storing device data to be used for a setting value of a device and an identification (ID) uniquely assigned to the device data in association with each other, the device data management system includes an issuance unit configured to issue an alias allowing unique identification of the device data that is similar to the ID, separately from issuance of the ID allowing unique identification of the device data, a holding unit configured to hold alias information in which the ID is further associated with the alias issued by the issuance unit, and a provision unit configured to identify the device data based on the alias and the alias information in response to receipt of a request from a request source, the alias and the alias information being included in the request, and provide the identified device data, wherein the issued alias is disabled by changing a provision range of the device data, and control is performed so that the device data is not provided based on the disabled alias.

Further features will become apparent from the following description of exemplary embodiments with reference to the attached drawings.

BRIEF DESCRIPTION OF THE DRAWINGS

FIG. 5 is a diagram illustrating an example of setting data.

FIG. 6 is a diagram illustrating an example of a script executed by the device.

FIGS. 7A and 7B are diagrams illustrating examples of screens when setting data is managed in the PC.

FIGS. 8A and 8B are diagrams illustrating examples of screens when setting data is edited in the PC.

FIG. 9 is a diagram illustrating an example of alias information managed by an alias management unit.

FIG. 11 is a flowchart illustrating a flow of a process in which the PC acquires a setting data list from the management server.

FIGS. 12A and 12B are diagrams illustrating examples of a setting data management screen and an editing screen in the PC.

FIGS. 13A and 13B are diagrams illustrating examples of screens when the device acquires a script from the management server.

FIGS. 15A and 15B are diagrams illustrating examples of setting data transmitted from the management server to the PC.

FIG. 17 is a diagram illustrating an example of alias information managed by an alias management unit.

FIG. 20 is a diagram illustrating an example of a screen when setting data is managed in the PC.

FIG. 21 is a diagram illustrating an example of setting data transmitted from the management server to the PC.

DESCRIPTION OF THE EMBODIMENTS

When an information processing apparatus (hereinafter referred to as a "device") acquires setting data to be used for setting work from an external apparatus, the device can acquire the device data from the external apparatus by an authentication method different from user authentication for the purpose of improving the efficiency of work. The device data is, specifically, applied as the setting values of the device. However, since user authentication is not performed, unauthorized access may be made to the device data on the external apparatus. In such a case, a third person unrelated to the setting work for the device may easily change the device data by an impersonation attack.

The present disclosure is therefore directed to associating device data with temporary particular information and causing setting work for a device to be performed based on the particular information, to reduce the possibility of unauthorized access to the device data.

According to the present disclosure, it is possible to associate device data with temporary particular information and cause setting work for a device to be performed based on the particular information. The possibility of unauthorized access to the device data can be therefore reduced.

With reference to the drawings, embodiments for carrying out the present disclosure will be described below.

Figure 1:
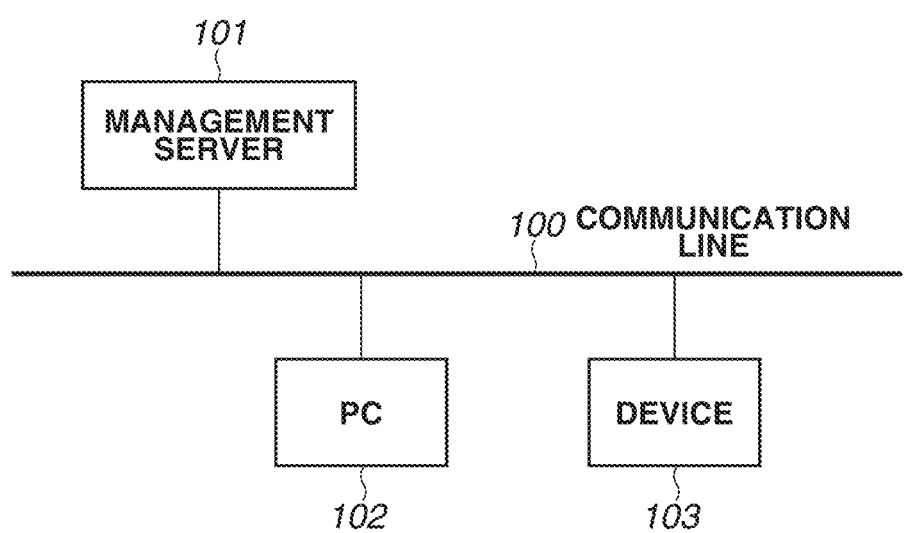
FIG. 1 is a diagram illustrating a configuration of a device data management system.

FIG. 1 is a diagram illustrating the configuration of a device data management system where a management server operates is an exemplary embodiment. A management server 101 is a management server that manages data (device data) including the setting values of a network device (hereinafter referred to as a "device") typified by a digital multifunction peripheral.

A personal computer (PC) 102 is an information processing apparatus that connects to the management server 101, performs user authentication, and then creates or edits the device data. A device 103 is a network device typified by a digital multifunction peripheral. The device 103 performs authentication (e.g., a known authentication technique such as device authentication) other than user authentication, connects to the management server 101, and acquires the device data created by the PC 102. In a case where a web service other than a service relating to setting data described in a first exemplary embodiment is used, user authentication may be performed. These devices are connected with each together via a communication line 100 to communicate with each other.

Figure 2:
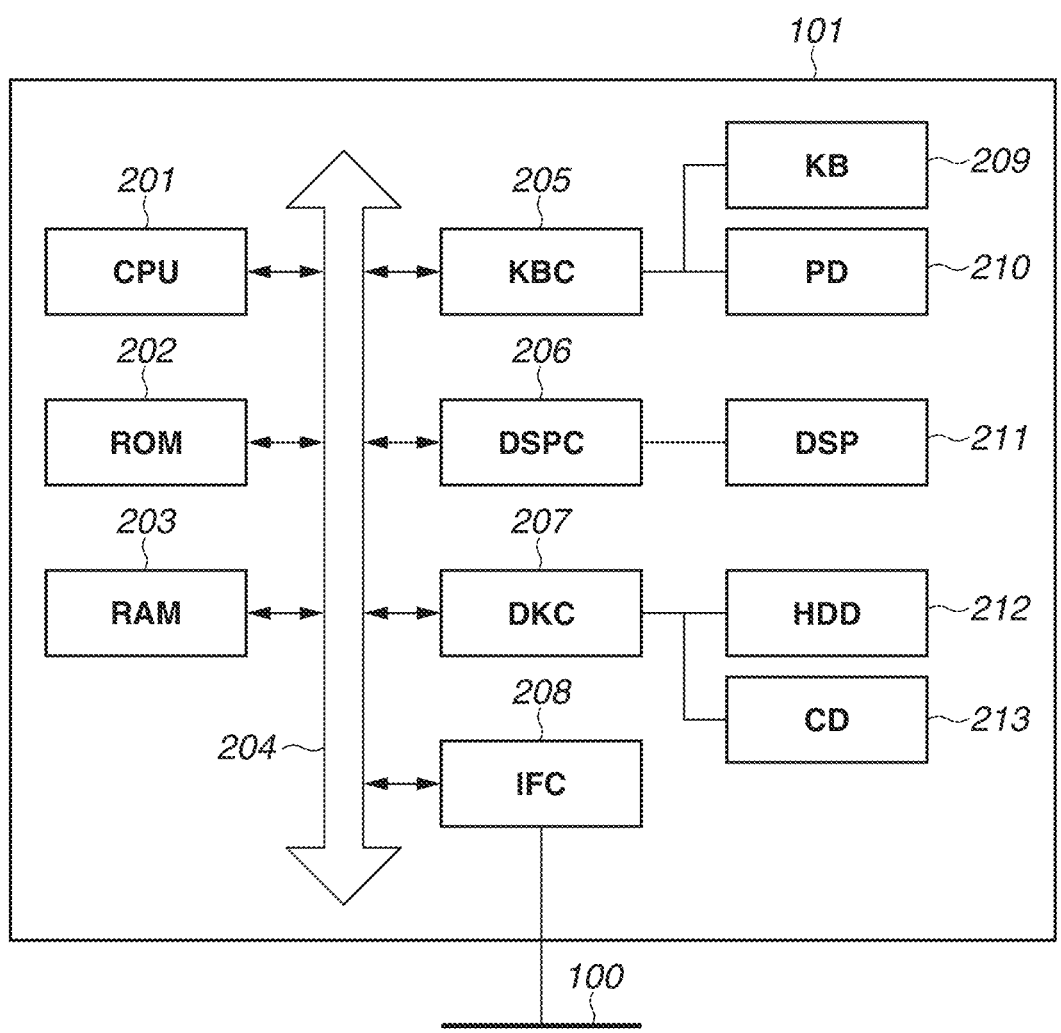
FIG. 2 is a diagram illustrating a hardware configuration of a management server.

FIG. 2 is a diagram illustrating the hardware configuration of the management server 101. A hard disk drive (HDD) 212 stores a device data management program according to the present exemplary embodiment. The device data management program performs operations in the following descriptions. A CPU 201 performs execution on hardware in the following descriptions unless otherwise noted. On the other hand, as described above, the device data management program stored in the HDD 212 performs control on software. That is, the CPU 201 reads and executes the device data management program recorded in a computer-readable manner in the HDD 212, whereby the functions of the management server 101 are achieved.

A read-only memory (ROM) 202 stores the Basic Input/Output System (BIOS) and a boot program. A random-access memory (RAM) 203 functions as a main memory or a work area for the CPU 201. A keyboard controller (KBC) 205 controls an instruction input from a keyboard (KB) 209 or a pointing device (PD) 210. A display controller (DSPC) 206 controls the display of a display (DSP) 211. A disk controller (DKC) 207 controls access to a storage device, such as the HDD 212 or a Compact Disc Read-Only Memory (CD-ROM) (CD) 213. The HDD 212 and the CD 213 store a boot program, an operating system, a database, the device data management program, and data of these. An interface controller (IFC) 208 communicates data with the PC 102 or the device 103 via the communication line 100. These components are connected to a system bus 204.

The device data management program according to the present exemplary embodiment may be supplied in the form of being stored in a storage medium, such as a CD-ROM. In this case, the program is read from the storage medium such as the CD 213 illustrated in FIG. 2 and installed on the HDD 212. Further, the hardware configuration of the PC 102 is also as illustrated in FIG. 2.

Figure 3:
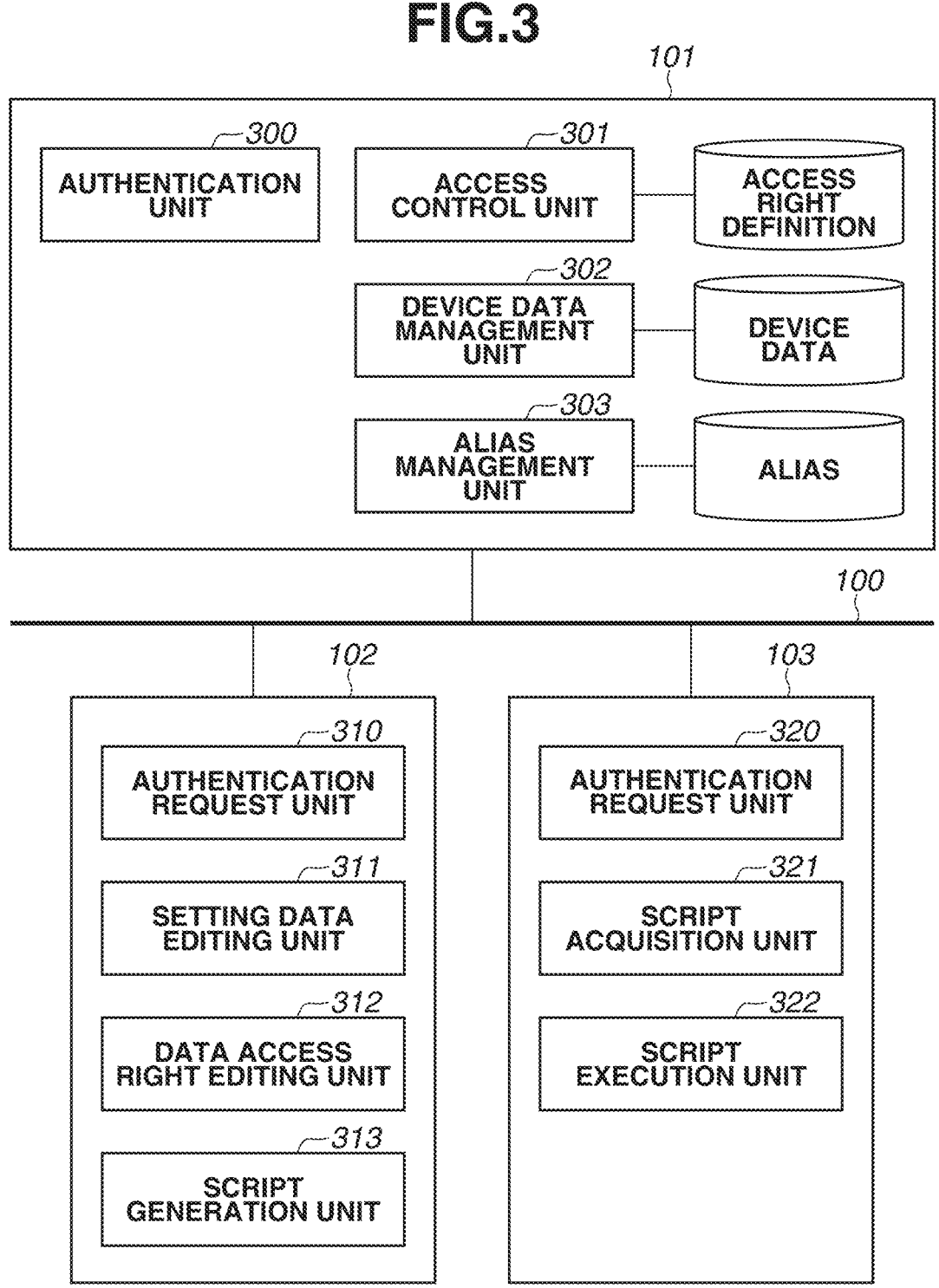
FIG. 3 is a diagram illustrating software configurations of the management server, a personal computer (PC), and a device.

FIG. 3 is a diagram illustrating the software configurations of the management server 101, the PC 102, and the device 103. In the management server 101, an authentication unit 300 performs authentication according to an authentication request from the PC 102 or the device 103 and determines whether the PC 102 or the device 103 can use the device data management system. Based on the authentication result of the authentication unit 300 and an access right set by a data access right editing unit 312, an access control unit 301 controls access to device data by the PC 102 or the device 103. A device data management unit 302 manages the device data transmitted from the PC 102. The device data includes setting data and a script. An alias management unit 303 manages an alias for the identification (ID) of the device data managed by the device data management unit 302. The alias is identification information as a substitute for the ID. By changing the alias without even changing the ID, it is possible to meet the provision range of the device data.

An authentication request unit 310 included in the PC 102 transmits an authentication request to the management server 101. In this processing, the authentication request unit 310 performs user authentication using an ID and a password to determine whether device data can be accessed in the management server 101. A setting data editing unit 311 acquires the setting data from the management server 101, and according to an instruction from a user, updates the setting data or saves the setting data in the management server 101. A data access right editing unit 312 sets the right to access the device data managed by the management server 101. The access right may be set with respect to each piece of device data, or may be set with respect to each user or each group (e.g., each organization) including a plurality of users.

When the setting data editing unit 311 saves the setting data in the management server 101, a script generation unit 313 generates a script (a group of commands executable by the device 103) based on the content of the setting data and saves the script in association with the setting data in the management server 101. Although the PC 102 generates the script in the present exemplary embodiment, the management server 101 may generate the script. In this case, the script is generated in such a manner that the script generation unit 313 operates on the management server 101, and when the PC 102 saves the setting data in the management server 101, the script generation unit 313 is called from the device data management unit 302. In either case, the setting data and the script are saved on a one-to-one basis.

In the device 103, an authentication request unit 320 transmits an authentication request to the management server 101. In this process, the device 103 acquires a particular script in the device data managed by the management server 101, and therefore, the authentication request unit 320 performs authentication (e.g., device authentication) other than user authentication. Since user authentication is not necessary, any user knowing the ID of the device data can set the device by turning on the device. A script acquisition unit 321 acquires a script in the device data from the management server 101. A script execution unit 322 executes the script acquired by the script acquisition unit 321, to change the setting of the device 103 or download a file.

The PC 102 or the device 103 communicates with the management server 101 using a known technique, such as Representational State Transfer (REST) or Simple Object Access Protocol (SOAP).

Figure 4:
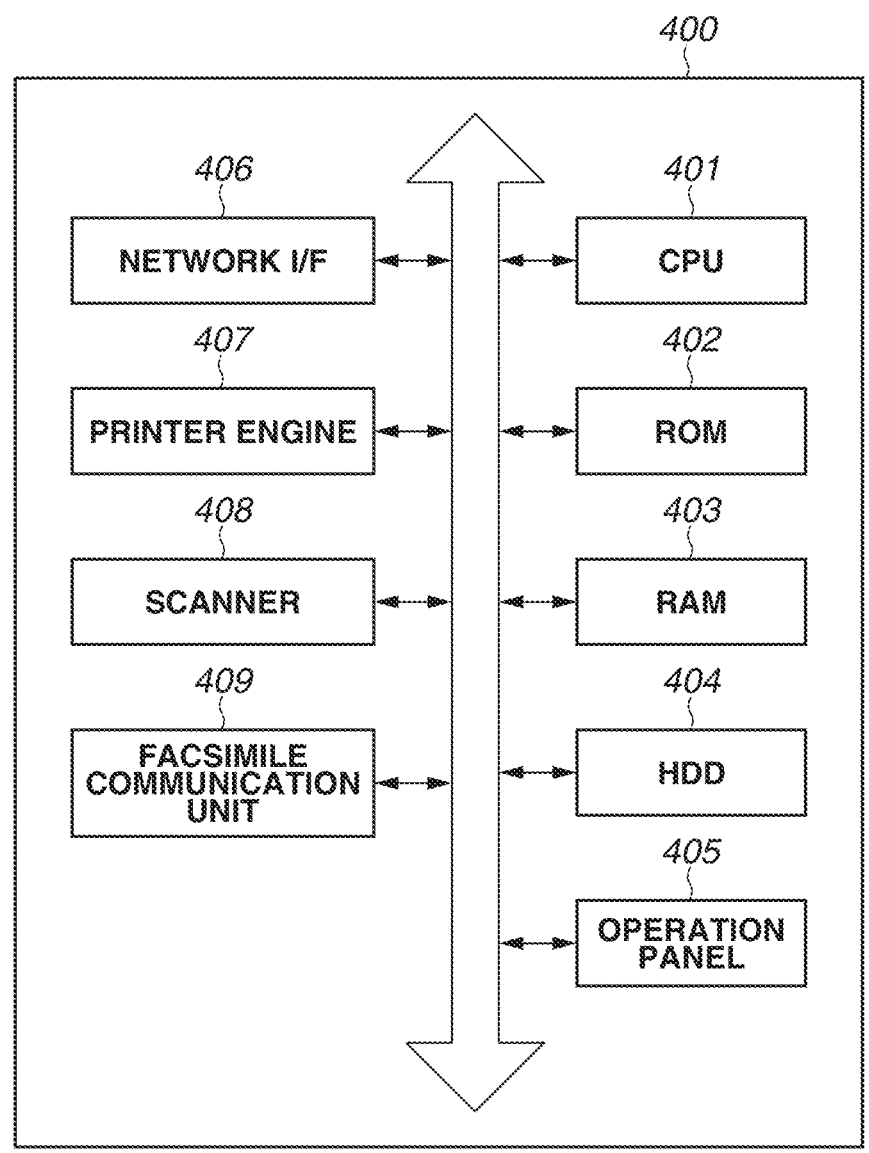
FIG. 4 is a diagram illustrating a hardware configuration of the device.

FIG. 4 is a diagram illustrating an example of the hardware configuration of the device 103. In FIG. 4, an image forming apparatus 400 is an example of the device 103 and has a print function, a scan function, and a network communication function. A CPU 401 governs the control of the entirety of the image forming apparatus 400. A ROM 402 stores a print processing program to be executed by the CPU 401 and font data. A RAM 403 is used as a work area or a reception buffer for the CPU 401, or used by the CPU 401 to draw an image. An HDD 404 records the setting values of the image forming apparatus 400.

An operation panel 405 includes various switches and buttons, a touch panel, and a liquid crystal display unit for displaying a message. On the operation panel 405, a user can change the setting values of the image forming apparatus 400. A network interface 406 is used to connect to a network. A printer engine 407 performs printing on a recording sheet. A scanner 408 is used to read a document. A communication unit 409 is used to transmit and receive a facsimile.

FIG. 5 is a diagram illustrating an example of the setting data from among the device data managed by the management server 101. The setting data holds information about a setting data ID, an organization ID, a setting data name, a setting value file, an address book, and a target device. The setting data ID is an identifier for uniquely identifying the setting data and is an ID uniquely assigned to each piece of setting data. The setting data ID is information also used by the device 103 to identify a script and is composed of a random number easy to input using the operation panel 405 of the device 103 and difficult to guess.

The organization ID is the ID of an organization owning the setting data. The setting data name is any character string for making it easy for the user to distinguish the setting data. The setting value file is the identifier of a file in which various setting values applied to the device 103 are described. The setting value file may include secret information or personal information, such as an administrator account or a password of the device 103, or a contact email address. The address book is the identifier of an address book applied to the device 103. The address book may include personal information, such as a fax number or an email address. The target device is the identifier of a device as a target to which the setting data is applied.

FIG. 6 is a diagram illustrating an example of the script executed by the device 103. Specifically, this script is an example of a script associated with setting data having "setting data ID=3152486128" illustrated in FIG. 5 and holds a processing number (the place of a process in processing order), the details of the process, the type of a content to be used in the process, and the identifier of the content to be used in the process. First, using the setting data ID as a key, the script execution unit 322 downloads the script illustrated in FIG. 6. Then, the script execution unit 322 sequentially executes setting processes in order of the processing numbers. If a content ID is specified for procedure of a process, the script execution unit 322 acquires the content via the communication line 100 on an as-needed basis. Various contents may be managed separately from the device data using the content IDs as keys and managed by a content server (not illustrated in FIG. 1), or the management server 101 may have the function of the content server.

In the example of the script in FIG. 6, the following procedure is described. As a first process (processing number 001), a setting value file S001 is downloaded. As a second process (processing number 002), the setting value file S001 is applied to the device 103. As a third process (processing number 003), the device 103 is rebooted. As a fourth process (processing number 004), "head office of company A.csv", in which information about an address book is described, is downloaded. As a fifth process (processing number 005), the downloaded file is imported into the address book. In practical applications, the script illustrated in FIG. 6 is represented as structured data, such as JavaScript (registered trademark) Object Notation (JSON), and is interpreted and executed by the script execution unit 322 of the device 103.

FIGS. 7A and 7B are diagrams illustrating examples of screens when setting data is managed in the PC 102. The screens illustrated in FIGS. 7A and 7B may be displayed by a client application that operates on the PC 102, or may be displayed as a web application provided by the management server 101 in response to connecting to the management server 101 by a web browser from the PC 102.

FIG. 7A is a login screen displayed first. If user authentication is successful on the login screen, a screen in FIG. 7B is displayed. FIG. 7B is a setting data list screen. On the setting data list screen, setting data that can be referenced by the logged-in user is displayed. Specifically, from among the setting data illustrated in FIG. 5, setting data owned by an organization which has the organization ID=0001 and to which a user 01 belongs is displayed. On this screen, it is possible to perform a management operation for creating or deleting setting data.

FIGS. 8A and 8B are diagrams illustrating examples of screens when setting data is edited in the PC 102. FIG. 8A illustrates an example of a screen displayed when an edit button for editing the setting data having the setting data ID=3152486128 is pressed in FIG. 7B. The setting data ID is automatically determined by the management server 101, and therefore cannot be changed. Information other than the setting data ID, such as the setting data name, the setting value file, and the address book, can be edited. Further, an outsourcing destination organization can be specified as an organization allowed to use the setting data. This allows a user in the outsourcing destination organization to perform setting work for the device 103 using the setting data. As content data, such as the setting value file or the address book, a content registered in the content server (not illustrated in FIG. 1) may be selected or a file saved in the HDD 212 of the PC 102 may be selected by pressing a reference button.

If a save button is pressed in FIG. 8A, the setting data editing unit 311 transmits the setting data input by the user to the management server 101 and saves the setting data. Further, in a case where a file saved in the PC 102 is specified as a content, and when the save button is pressed, the setting data editing unit 311 transmits the specified content to the content server (not illustrated in FIG. 1) and saves the specified content.

FIG. 8B is an outsourcing destination selection screen displayed when a select button for selecting an outsourcing destination is pressed in FIG. 8A, and is also a screen for determining the provision range of outsourcing destinations. An outsourcing destination can be additionally registered or deleted, as necessary. The organizations selected on this screen can reference or edit the setting data illustrated in FIG. 8A. The organizations thus allowed to reference or edit the setting data correspond to the provision range of outsourcing destinations.

FIG. 9 is a diagram illustrating an example of alias information managed by the alias management unit 303. An alias is assigned to each combination of a setting data ID and an outsourcing destination organization ID, and with respect to each alias, a status indicating whether the alias is enabled or disabled is managed. If the alias is enabled, the expiration date of the alias is set. According to the present exemplary embodiment, a predetermined expiration date (e.g., three months from the start of outsourcing) is set as the expiration date. Alternatively, the user may be allowed to specify the expiration date on the screen in FIG. 8A. The information thus managed in association with pieces of information is referred to as "alias information". The alias information, however, is not necessarily limited to these pieces of information. For example, the alias information may lack the outsourcing destination organization ID.

Figure 10:
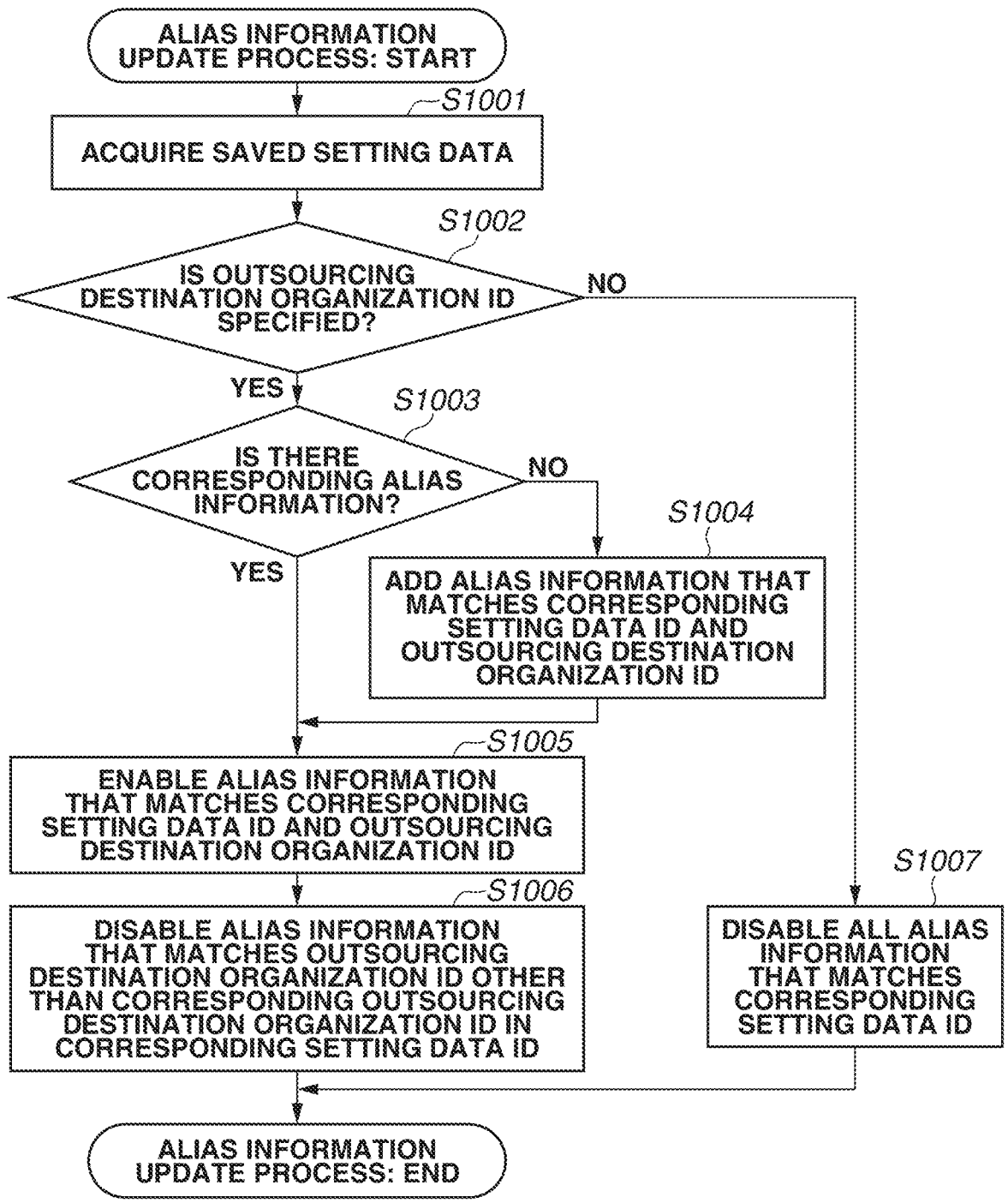
FIG. 10 is a flowchart illustrating a procedure of a process in which the management server updates alias information.

FIG. 10 is a flowchart illustrating the processing procedure in which the management server 101 updates alias information. The processing illustrated in the flowchart in FIG. 10 is executed by the alias management unit 303 in the management server 101. More specifically, the processing of the flowchart in FIG. 10 is achieved by the CPU 201 reading and executing a program recorded in the HDD 212.

In step S1001, the alias management unit 303 receives an alias information update instruction from the device data management unit 302 and acquires setting data saved by the device data management unit 302. In step S1002, the alias management unit 303 determines whether the outsourcing destination organization ID is specified in the setting data acquired in step S1001. If the outsourcing destination organization ID is specified (YES in step S1002), the processing proceeds to step S1003. If the outsourcing destination organization ID is not specified (NO in step S1002), the processing proceeds to step S1007.

In step S1003, the alias management unit 303 determines whether there is alias information that matches the combination of the setting data ID and the outsourcing destination organization ID acquired in step S1001. If there is alias information that matches the combination (YES in step S1003), the processing proceeds to step S1005. If there is not alias information that matches the combination (NO in step S1003), the processing proceeds to step S1004. In step S1004, the alias management unit 303 issues an alias corresponding to the combination of the setting data ID and the outsourcing destination organization ID acquired in step S1001 and adds alias information. By such processing, a piece of alias information in which the setting data ID, the outsourcing destination organization ID, and the alias are associated with device data is generated.

In step S1005, the alias management unit 303 enables the status of the alias information that matches the combination of the setting data ID and the outsourcing destination organization ID acquired in step S1001, and also sets a predetermined expiration date. In step S1006, the alias management unit 303 disables the status of alias information that does not match the corresponding outsourcing destination organization ID, from among the alias information that matches the corresponding setting data ID. For example, if the saved setting data ID is "3152486128", and "0002" is specified as the outsourcing destination organization ID, then in the example of FIG. 9, the alias management unit 303 disables the status of the second row (the setting data ID=3152486128 and the outsourcing destination organization ID=0007). This is to prevent a single piece of setting data from being simultaneously outsourced to a plurality of outsourcing destination organizations.

In step S1007, the alias management unit 303 disables the status of all the alias information that matches the corresponding setting data ID. For example, if the saved setting data ID is 3152486128 and the outsourcing destination organization is not specified, then in the example of FIG. 9, the alias management unit 303 disables the statuses of both the first row (the setting data ID=3152486128 and the outsourcing destination organization ID=0002) and the second row (the setting data ID=3152486128 and the outsourcing destination organization ID=0007). This means that the outsourcing of the corresponding setting data is canceled so that a user in another organization cannot reference or edit the setting data.

FIG. 11 is a flowchart illustrating the processing procedure in which the PC 102 as a request source acquires a setting data list from the management server 101. The processing illustrated in the flowchart in FIG. 11 is executed by the device data management unit 302 in the management server 101. That More specifically, the processing of the flowchart in FIG. 11 is achieved by the CPU 201 reading and executing a program recorded in the HDD 212.

In step S1101, the device data management unit 302 receives a setting data list acquisition request from the PC 102. In step S1102, the device data management unit 302 extracts setting data of which the owner has the same organization ID as that of a request transmission source organization, from among setting data managed by the management server 101. Then, the device data management unit 302 adds the extracted setting data to a list of setting data.

In step S1103, via the alias management unit 303, the device data management unit 302 determines whether there is setting data outsourced to the request transmission source organization (i.e., setting data of which alias information is enabled). If there is setting data outsourced to the request transmission source organization (YES in step S1103), the processing proceeds to step S1104. If there is not setting data outsourced to the request transmission source organization (NO in step S1103), the processing proceeds to step S1107. In step S1104, via the alias management unit 303, the device data management unit 302 determines whether the alias information is within the validity period, i.e., not past the expiration date. If the alias information is within the validity period (YES in step S1104), the processing proceeds to step S1105. If the alias information is past the expiration date (NO in step S1104), the processing proceeds to step S1106.

In step S1105, the device data management unit 302 replaces the setting data ID of the setting data with an alias corresponding to the outsourcing destination organization ID and then adds the setting data to the list of setting data. This replacement is not the rewriting of the setting data ID of the device data itself managed by the device data management unit 302 (i.e., illustrated in FIG. 5), but the rewriting of list data (i.e., FIG. 11) to be transmitted from the management server 101 to the PC 102 as the processing result of the flowchart illustrated in FIG. 11. More specifically, the replacement means that as data to be transmitted to the PC 102, the setting data ID of the setting data loaded from the HDD 212 into the RAM 203 is replaced with an alias, but does not mean that the setting data itself on the HDD 212 is rewritten.

In step S1106, the device data management unit 302 determines whether the processing on all the setting data outsourced to the request transmission source organization is completed. If the processing on all the setting data is completed (YES in step S1106), the processing proceeds to step S1107. If there is setting data that has not yet been processed (NO in step S1106), the processing returns to step S1104. In step S1107, the device data management unit 302 transmits to the request source, i.e., the PC 102, the list of setting data to which the setting data is added in steps S1102 and S1105.

FIGS. 12A and 12B are diagrams illustrating examples of a setting data management screen and an editing screen in the PC 102 that are displayed to a user in an outsourcing destination organization. Specifically, FIGS. 12A and 12B illustrate examples of screens displayed to a user in an organization having the organization ID=0002. FIG. 12A is a setting data list screen displayed to the user in the organization having the organization ID=0002. Based on the example of FIG. 5, setting data having the setting data ID=5807515798 is displayed as setting data owned by the organization having the organization ID=0002. Further, setting data outsourced by the organization having the organization ID=0001 is also displayed. On this screen, for the setting data outsourced by the organization having the organization ID=0001, not the original setting data ID (3152486128) but an alias (4848762108) is displayed. As illustrated in FIG. 12A, a check box is not provided for the outsourced setting data so that the user in the organization having the organization ID=0002 cannot delete the outsourced setting data.

FIG. 12B is a setting data editing screen displayed when an edit button for editing the outsourced setting data is pressed in FIG. 12A. Also on this screen, an alias is displayed as the setting data ID. FIG. 12B is different from an editing screen for editing data by an organization owing the data (i.e., FIG. 8A) in that the screen in FIG. 12B does not have a selection function for selecting an outsourcing destination, and instead of this, the organization ID of an outsourcing source is displayed. As illustrated in FIGS. 12A and 12B, the alias for the setting data ID is displayed to the user in the organization having the organization ID=0002 as the outsourcing destination so that the user will not see the original setting data ID.

FIGS. 13A and 13B are diagrams illustrating examples of screens when the device 103 as a request source acquires a script from the management server 101. FIG. 13A illustrates a screen for inputting an organization ID and a setting data ID to search the device data managed by the management server 101 for a desired script. On this screen, user authentication is not used, and search for setting data is allowed using number information which is easy for the user to input to the operation panel 405 in the device 103. If a search button is pressed, and device data that matches the combination of the organization ID and the setting data ID specified by the user is saved in the management server 101, the screen in FIG. 13B is displayed. If device data that matches the combination is not saved, an error screen (not illustrated) is displayed.

FIG. 13B is a screen for confirming the content of setting data that matches the organization ID and the setting data ID specified in FIG. 13A. The setting data name and the contents of the setting processes are displayed, and if an execute button is pressed, the script execution unit 322 of the corresponding device executes setting work. Specifically, the script execution unit 322 acquires a script (FIG. 6) corresponding to the setting data ID from the management server 101, and based on the acquired script, executes the setting processes while appropriately downloading contents specified by the script. If the script execution unit 322 executes the script to the end, a setting completion screen (not illustrated) is displayed on the operation panel 405 in the device 103.

When the device 103 starts communicating with the management server 101, the authentication request unit 320 performs device authentication in the background. This prevents an improper device from using the device data management system. Since not user authentication but device authentication is performed, it is possible to save the trouble of inputting user information to each device, thereby improving efficiency. Further, since the setting data ID is an alias, the alias is disabled after the outsourcing contract is canceled, and thus, the device cannot be set. That is, unless the outsourcing destination organization is changed, a user in the organization having the outsourcing contract can acquire the device data based on the alias and perform setting work for the device 103. Further, even if the alias itself is disabled, the device data ID itself originally set for the device data is not disabled. Thus, the uniqueness of the device data is not lost by changing the outsourcing destination organization. Thus, the management server 101 can easily manage the device data.

Figure 14:
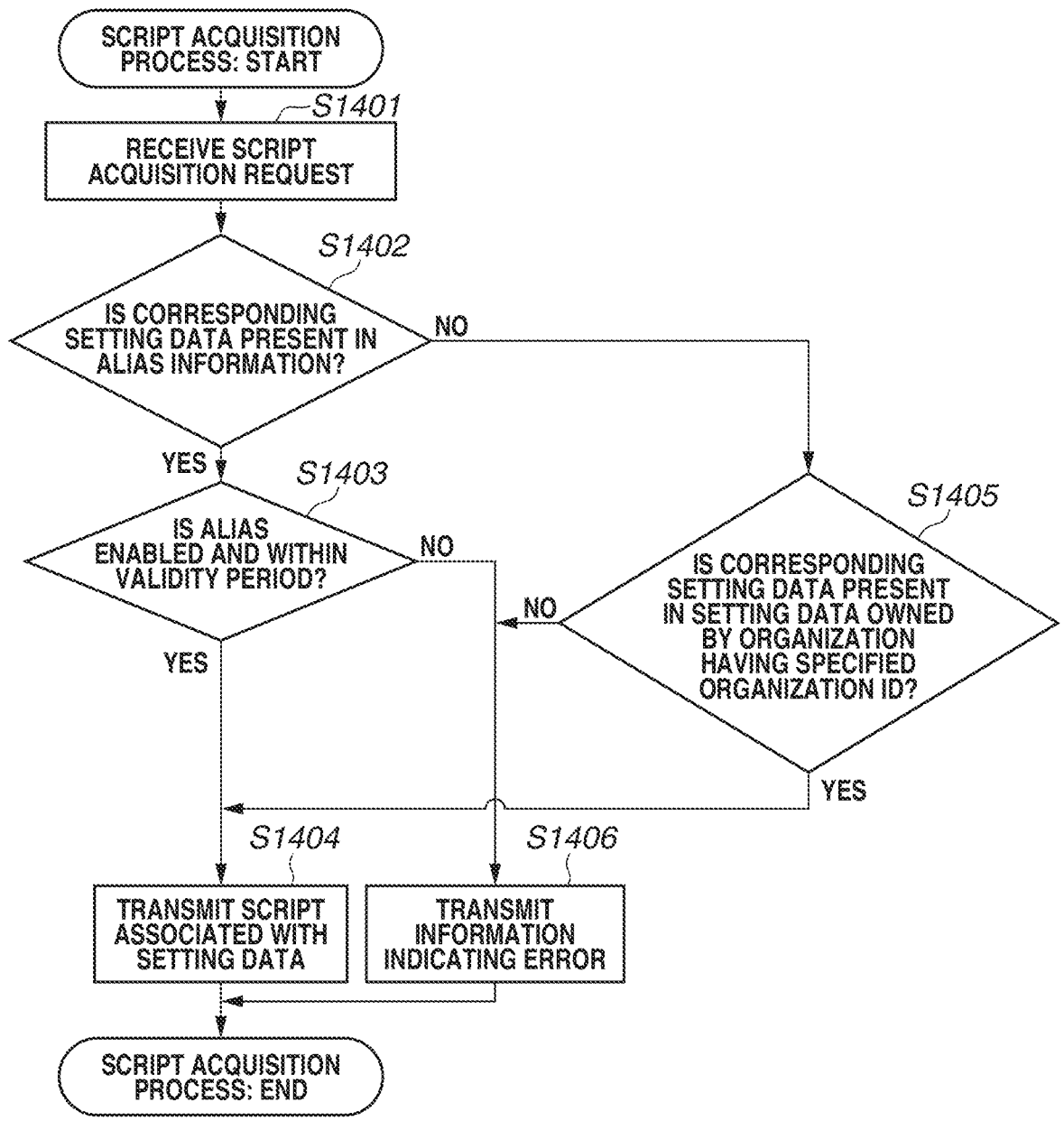
FIG. 14 is a flowchart illustrating a procedure of a process in which the device acquires a script from the management server.

FIG. 14 is a flowchart illustrating the processing procedure in which the device 103 acquires a script from the management server 101. The processing illustrated in the flowchart in FIG. 14 is executed by the device data management unit 302 in the management server 101. That is, the processing of the flowchart in FIG. 14 is achieved by the CPU 201 reading and executing a program recorded in the HDD 212.

In step S1401, the device data management unit 302 receives a script acquisition request from the device 103 via the authentication unit 300 and the access control unit 301. In step S1402, via the alias management unit 303, the device data management unit 302 determines whether there is alias information that matches the combination of the organization ID and the setting data ID specified in the request received in step S1401. If there is corresponding alias information (YES in step S1402), the processing proceeds to step S1403. If there is not corresponding alias information (NO in step S1402), the processing proceeds to step S1405.

In step S1403, based on the alias information found in step S1402, the device data management unit 302 determines whether the status of the alias is enabled and within the validity period. If the alias is enabled and within the validity period (YES in step S1403), the processing proceeds to step S1404. If the alias is disabled or expired (NO in step S1403), the processing proceeds to step S1406. In step S1404, the device data management unit 302 acquires a script associated with setting data identified in step S1403 or S1405 and transmits the script to the device 103.

In step S1405, the device data management unit 302 determines whether there is setting data that matches the combination of the organization ID and the setting data ID specified in the request received in step S1401. If there is setting data that matches the combination (YES in step S1405), the processing proceeds to step S1404. If there is not setting data that matches the combination (NO in step S1405), the processing proceeds to step S1406. If the device data management unit 302 determines that there is not setting data that matches the combination of the organization ID and the setting data ID specified in the request received in step S1401 (NO in step S1405), then in step S1406, the device data management unit 302 transmits information indicating an error to the device 103.

In the present exemplary embodiment, the setting data ID is not necessary in the script, and therefore is not included in the script. However, in a case where the setting data ID is included, and when the processing proceeds from step S1403 to S1404, the setting data ID included in the script may be replaced with an alias, and then, the script may be transmitted to the device 103. Similarly to step S1105, this replacement is not the rewriting of the script itself managed by the device data management unit 302, but the rewriting of data to be transmitted from the management server 101 to the PC 102 as the processing result of FIG. 14. Based on the script acquired as the processing result of FIG. 14, the screen illustrated in FIG. 13B is displayed. Then, if the execute button is pressed, the script execution unit 322 executes the setting processes.

FIGS. 15A and 15B are diagrams illustrating examples of the setting data transmitted from the management server 101 to the PC 102 as a result of the processing illustrated in FIG. 11. FIG. 15A is an example of a case where the owner of the setting data, i.e., the user in the organization having the organization ID=0001, logs into the device data management system using the PC 102 and acquires the setting data. A setting data ID 1501 is set to the original value as illustrated in FIG. 5. FIG. 15B is an example of a case where the outsourcing destination, i.e., the user in the organization having the organization ID=0002, logs into the device data management system using the PC 102 and acquires the same setting data as that in FIG. 15A. FIG. 15B is different from FIG. 15A only in a portion of a setting data ID 1502. As a result of the process of step S1105, the setting data ID 1502 is set to the value of the alias as illustrated in FIG. 9.

According to the first exemplary embodiment, the management server 101 manages an alias for a setting data ID, and when the alias is enabled, the management server 101 permits another person to access setting data using an ID represented by the alias. Thus, it is possible to temporarily provide device data to another person and also appropriately protect the device data.

Figure 16:
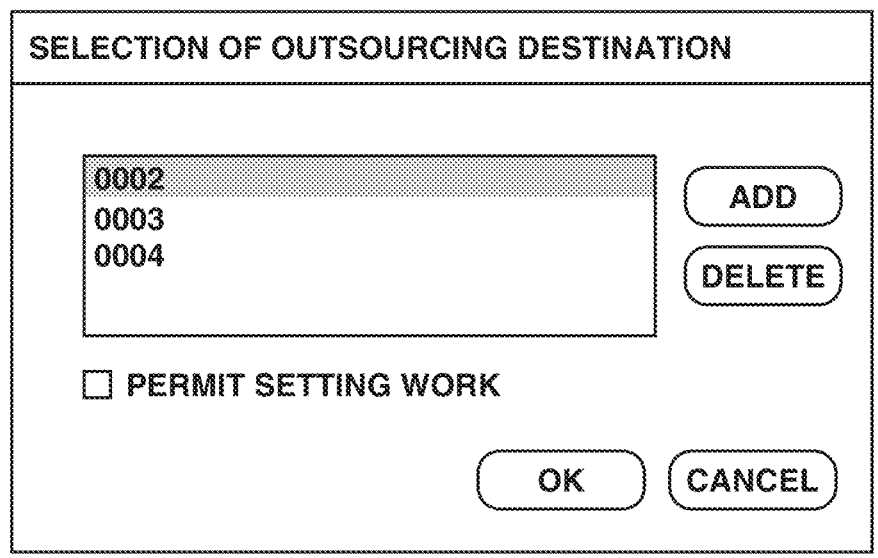
FIG. 16 is a diagram illustrating an example of a screen when setting data is edited in a PC.

In a second exemplary embodiment of the present disclosure, configurations illustrated in FIGS. 1 to 7A and 7B and FIGS. 13A, 13B and 14 are similar to those in the first exemplary embodiment. Thus, similar portions are designated by the same signs, and therefore are not described here. FIG. 16 is a diagram illustrating an example of a screen when setting data is edited in the PC 102. FIG. 16 is different from FIG. 8B in that it is possible to specify whether to permit the outsourcing destination organization to perform setting work for the device.

A case where the outsourcing destination organization is permitted to perform setting work is similar to that in the first exemplary embodiment. That is, in a case where a certain organization (an organization A) creates setting data and outsources the execution of setting work to another organization (an organization B), the organization A issues an alias for the setting data ID to the outsourcing destination organization B, whereby the organization B can acquire a script corresponding to the setting data from the device 103.

On the other hand, a setting for not permitting the outsourcing destination organization to perform setting work is used in a case where, based on an instruction from a certain organization (an organization C), another organization (an organization D) creates setting data and also performs setting work. For example, there may be a case where the setting work is not successful due to the inconsistency of settings ordered by the organization C, and the organization D cannot solve the inadequacy of the setting data. In such a case, the organization D may share the setting data with the outsourcing destination organization C and ask the organization C to check the content of the setting data. Since the outsourcing destination organization C does not perform setting work, the organization D does not need to issue an alias for the setting data ID to the organization C. Additionally, it is desirable to conceal the setting data ID so that setting data likely to include personal information or secret information is not easily identified. Thus, in a case where the outsourcing destination organization is not permitted to perform setting work, the management server 101 does not issue an alias for the setting data ID to the outsourcing destination organization, but needs to mask the setting data ID with a meaningless value (the details of the mask process will be described below with reference to FIG. 19).

FIG. 17 is a diagram illustrating an example of alias information managed by the alias management unit 303. FIG. 17 is different from FIG. 9 in that there is an alias of which the status is "enabled (setting prohibited)". In a case where a setting for not permitting setting work is set in FIG. 16, then as illustrated in FIG. 17, the status becomes "enabled (setting prohibited)". In the example of FIG. 17, an alias is issued even if the status is "enabled (setting prohibited)". Actually, however, the alias is not used, and therefore, the value of the alias may be set to null without issuing the alias.

Figure 18:
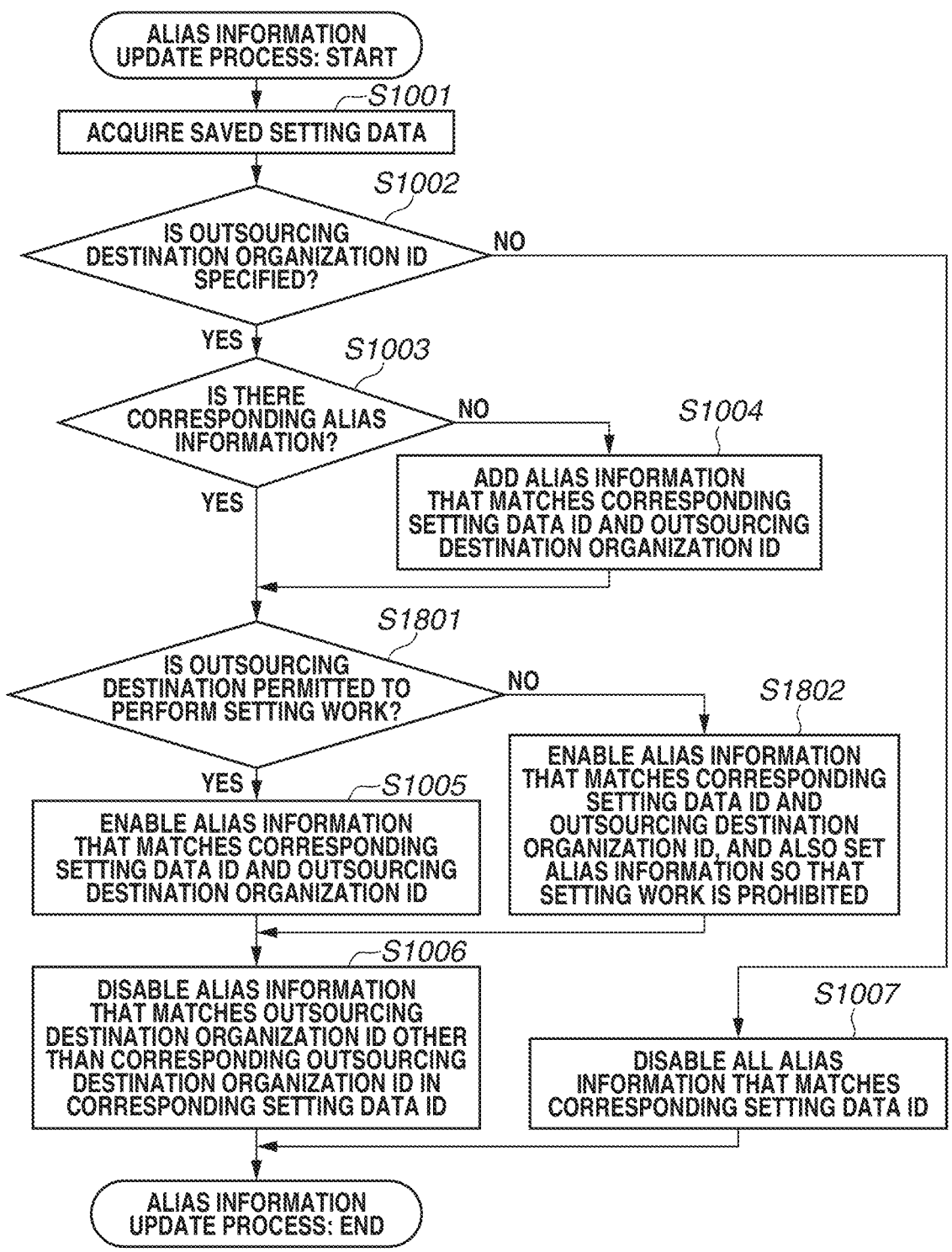
FIG. 18 is a flowchart illustrating a procedure of a process in which a management server updates alias information.

FIG. 18 is a flowchart illustrating the processing procedure in which the management server 101 updates alias information. FIG. 18 is different from FIG. 10 in that the processes of steps S1801 and S1802 are added. Processes similar to those in FIG. 10 are designated by the same signs, and therefore are not described here.

In step S1801, the alias management unit 303 determines whether the outsourcing destination organization is permitted to perform setting work in the setting data acquired in step S1001. If the outsourcing destination organization is permitted to perform setting work (YES in step S1801), the processing proceeds to step S1005. If the outsourcing destination organization is not permitted to perform setting work (NO in step S1801), the processing proceeds to step S1802.

In step S1802, the alias management unit 303 enables the status of the alias information that matches the combination of the setting data ID and the outsourcing destination organization ID acquired in step S1001, and also sets the status of the alias information so that setting work is prohibited. Further, the alias management unit 303 sets a predetermined expiration date.

Figure 19:
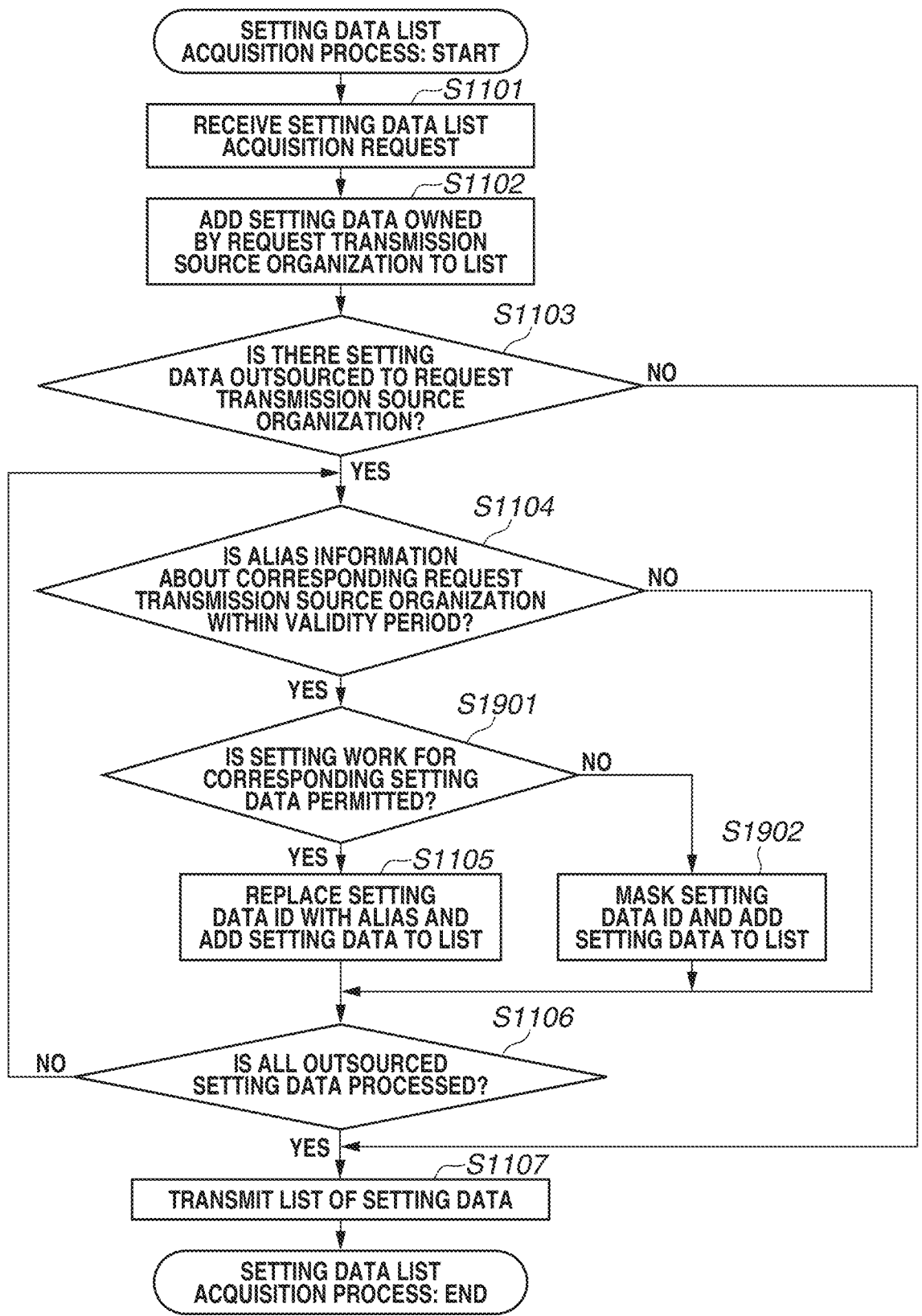
FIG. 19 is a flowchart illustrating a procedure of a process in which the PC acquires a setting data list from the management server.

FIG. 19 is a flowchart illustrating the processing procedure in which the PC 102 acquires a setting data list from the management server 101. FIG. 19 is different from FIG. 11 in that the processes of steps S1901 and S1902 are added. Processes similar to those in FIG. 11 are designated by the same signs, and therefore are not described here.

In step S1901, via the alias management unit 303, the device data management unit 302 determines whether the status of the alias information is set so that setting work is permitted. If the alias information is set so that setting work is permitted (YES in step S1901), the processing proceeds to step S1105. If the alias information is set so that setting work is not permitted (NO in step S1901), the processing proceeds to step S1902.

In step S1902, the device data management unit 302 masks the setting data ID of the corresponding setting data as "**********", for example, and then adds the setting data to the list of setting data. Similarly to step S1105, this mask is not the rewriting of the device data itself managed by the device data management unit 302, but the rewriting of list data to be transmitted from the management server 101 to the PC 102 as the processing result of FIG. 19.

FIG. 20 is a diagram illustrating an example of a screen when setting data is managed in the PC 102. FIG. 20 is different from FIG. 12A in that the setting data ID of the outsourced setting data is masked with "**********". This is a result of the processing in which the outsourcing destination organization is not permitted to perform setting work in FIG. 16, and the process of step S1902 is executed.

FIG. 21 is a diagram illustrating an example of the setting data transmitted from the management server 101 to the PC 102. FIG. 21 is different from FIGS. 15A and 15B in that the value of a setting data ID 2101 is masked with "**********". This is a result of the processing executed in step S1902 illustrated in FIG. 19.

According to the second exemplary embodiment, in a case where an outsourcing destination organization is permitted only to reference and edit setting data, the ID of the setting data is not disclosed. Thus, it is possible to reduce the risk of a third person easily identifying the setting data.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-010492, filed Jan. 25, 2018, which is hereby incorporated by reference herein in its entirety.

What is claimed is:

1. A device data management system for storing device data to be used for a setting value of a device and an identification (ID) uniquely assigned to the device data in association with each other, the device data management system comprising:
　at least one memory storing instructions; and
　at least one processor that, upon execution of the instructions, is configured to issue an alias allowing unique identification of the device data that is similar to the ID, separately from issuance of the ID allowing unique identification of the device data;
　store, in that least one memory, alias information in which the ID is further associated with the issued alias; and
　identify the device data based on the alias and the alias information in response to receipt of a request from a request source, the alias and the alias information being included in the request, and provide the identified device data,
　wherein the issued alias is disabled by changing a provision range of the device data, and control is performed so that the device data is not provided based on the disabled alias.

2. The device data management system according to claim 1,
　wherein every time an instruction to change the provision range of the device data is received, an alias is issued, and
　wherein the at least one memory stores information in which the ID is further associated with the issued alias.

3. The device data management system according to claim 2,
　wherein the instruction to change the provision range of the device data is an instruction to change an outsourcing destination organization that performs setting work for the device,
　wherein the alias information is further stored in association with an outsourcing destination organization ID, and
　wherein the outsourcing destination organization ID included in the request is checked in response to receipt of a request from a client as a request source and provides a list of aliases associated with the outsourcing destination organization ID.

4. The device data management system according to claim 3, wherein in a case where, according to the instruction to change the outsourcing destination organization, an outsourcing destination organization that does not perform setting work for the device is included in the provision range of the device data, the alias is not associated with the outsourcing destination organization that does not perform setting work for the device.

5. The device data management system according to claim 4, wherein, in response to receipt of a request from a client in the outsourcing destination organization that does not perform setting work for the device, the list in which portions of the aliases are masked is provided.

6. The device data management system according to claim 1, wherein in a case where the a new alias is issued, the alias information associated with the new alias is enabled and the alias information associated with an old alias is disabled.

7. The device data management system according to claim 1,
　wherein, in response to receipt of a request from a device as a request source, a script is provided in the device data, and
　wherein the script describes an instruction to download setting data including a file regarding a setting value and is executed by the device.

8. The device data management system according to claim 1, wherein the device includes an image forming apparatus including a printer engine configured to perform printing on a recording sheet.

9. A control method for controlling a device data management system for storing device data to be used for a setting value of a device and an identification (ID) uniquely assigned to the device data in association with each other, the control method comprising:
　issuing an alias allowing unique identification of the device data that is similar to the ID, separately from issuance of the ID allowing unique identification of the device data;
　storing, in a memory, alias information in which the ID is further associated with the issued alias; and
　identifying the device data based on the alias and the alias information in response to receipt of a request from a request source, the alias and the alias information being included in the request and providing the identified device data,
　wherein the issued alias is disabled by changing a provision range of the device data, and control is performed in such a manner that the device data is not provided based on the disabled alias.

10. A non-transitory computer-readable storage medium storing a program that causes a computer to perform a control method for controlling a device data management system for storing device data to be used for a setting value of a device and an identification (ID) uniquely assigned to the device data in association with each other, the control method comprising:
- issuing an alias allowing unique identification of the device data that is similar to the ID, separately from issuance of the ID allowing unique identification of the device data;
- storing, in a memory, alias information in which the ID is further associated with the issued alias; and
- identifying the device data based on the alias and the alias information in response to receipt of a request from a request source, the alias and the alias information being included in the request and providing the identified device data,
- wherein the issued alias is disabled by changing a provision range of the device data, and control is performed in such a manner that the device data is not provided based on the disabled alias.

* * * * *